United States Patent [19]

Dürkop et al.

[11] Patent Number: 4,746,309
[45] Date of Patent: May 24, 1988

[54] CLOSURE ELEMENT FOR MULTI-POLE ELECTRICAL CONNECTOR

[75] Inventors: Willi Dürkop, Demtold; Hartmut Schmode, Blomberg; Klaus Strate, Detmold; Walter Hanning, Hiddenhausen; Ferdinand Steinkuhle, Paderborn, all of Fed. Rep. of Germany

[73] Assignee: C. A. Weidmüller GmbH & Co, Detmold, Fed. Rep. of Germany

[21] Appl. No.: 25,006

[22] Filed: Mar. 12, 1987

[30] Foreign Application Priority Data

Mar. 12, 1986 [EP] European Pat. Off. ........ 86103330.6

[51] Int. Cl.⁴ ............................................. H01R 13/58
[52] U.S. Cl. .................................. 439/471; 174/138 F
[58] Field of Search .................... 174/138 F; 439/464, 439/467, 468, 471, 473, 596

[56] References Cited

U.S. PATENT DOCUMENTS 3,293,591 12/1966 Mayer, Jr. .................... 174/138 F
3,727,174 4/1973 Podmore et al. .................... 439/596

FOREIGN PATENT DOCUMENTS 183939 6/1986 European Pat. Off. ............ 439/471

Primary Examiner—Neil Abrams
Attorney, Agent, or Firm—Erwin S. Teltscher

[57] ABSTRACT

A closing element for closing an electrical connector has a hood-shaped body with a first narrow end side opening and a second bordering upper side opening for selective leading out of a conductor bundle connectable with the connector, and two closing pieces foldably connectable with one edge and releasably securable to the other edge of the openings, each of the closing pieces being separable into a plurality of partial segments, so that upon the separation a passage is open for leading out of the conductor bundle; however the separated partial segments remain foldably connected with the other edge of the respective opening to form pull release or strain relief means for the conductor bundle.

8 Claims, 1 Drawing Sheet

CLOSURE ELEMENT FOR MULTI-POLE ELECTRICAL CONNECTOR

BACKGROUND OF THE INVENTION

The present invention relates to a closure element or hood for a multi-pole electrical connector.

More particularly, it relates to such a closure hood which has a first opening provided in its narrow or smaller side and a second opening provided in its upper or wider side and bordering the first opening, for selective leading-out of the bundle of conductors connected with the electrical connector, and which also has a closing piece connected with an opening edge region and composed of separable partial segments, and pull release means provided on the closing piece.

Closure elements or hoods for multi-pole electrical connectors are known in the art. A known closure element of this type includes a hood-shaped body provided with an opening for leading out a bundle of conductors, and means for closing the opening. It is believed to be understood that the known closure element can be further improved.

SUMMARY OF THE INVENTION

Accordingly, it is an object of the present invention to provide a closure hood of the above-mentioned type, which is further simplified in its manufacture, storage and mounting.

In keeping with these objects and with others which will become apparent hereinafter, one feature of the present invention resides, briefly stated, in a closure hood in which the closing pieces with sizes corresponding to the sizes of the openings in the smaller end side and in the upper side are foldably connected with edges at one side of both openings, releasably connectable with the opposite opening edge, and transversely splitable into partial segments corresponding to the required cross section for the conductor bundle, and which closing pieces remain connected with one opening edge and form the pull release means.

When the closure hood is designed in accordance with these novel features, it can be manufactured in a favorable manner with both closing pieces for both openings, for example by injection molding as a simple injection molded part. Separate manufacture and storage of special closing pieces is no longer needed, and there is no more danger that a user can lose such closing pieces later on.

Furthermore, it is not necessary to have specially formed pull release or unloading parts, since the partial segments which are transversely separated from the closing piece for releasing the required cross-section for the conductor bundle can be directly used as stable pull release or strain relief means for binding the conductor bundle thereto. There is also the advantage that the openings provided in the closure hood do not have to be equally long in each case. This is advantageous when a special closing piece is employed which is selectively insertable in both openings.

The mounting of the inventive closure hood is very simple for a user. The closure hood with the closing pieces connected with it can be supplied in an open condition. The user selects the desired position or in other words the side of the throughgoing opening, selects the required cross section for leading out, separates the correspondingly sized partial segments from the respectively placed closing piece, leads the cable bundle past this partial segment piece, and binds the cable to the latter for pull release or unloading. The closing piece of the opening which is not required and the remaining partial segment piece of the separated closing piece are folded by 90° and connected with the opposite opening edge region of the closure hood.

In accordance with another advantageous feature of the present invention, the closing pieces are connected with opening edges by means of film hinges formed in the closure hood.

Still another feature of the present invention is that the releasable securement of the free edges of the connecting pieces or the partial segments with the respective opening edge can be formed as a geometrically simple arresting connection.

The separation of the connecting pieces for formation of respective required partial segments can be facilitated by providing transverse notches extending along the folding axis, in accordance with a further feature of the present invention. The transverse separation can be performed, for example, by a cutting device.

The novel features of the present invention are set forth in particular in the appended claims. The invention itself, however, both as to its construction and its manner of operation, will be best understood from the following description of preferred embodiments which is accompanied by the following drawings.

DESCRIPTION OF PREFERRED EMBODIMENTS

Figure 1:
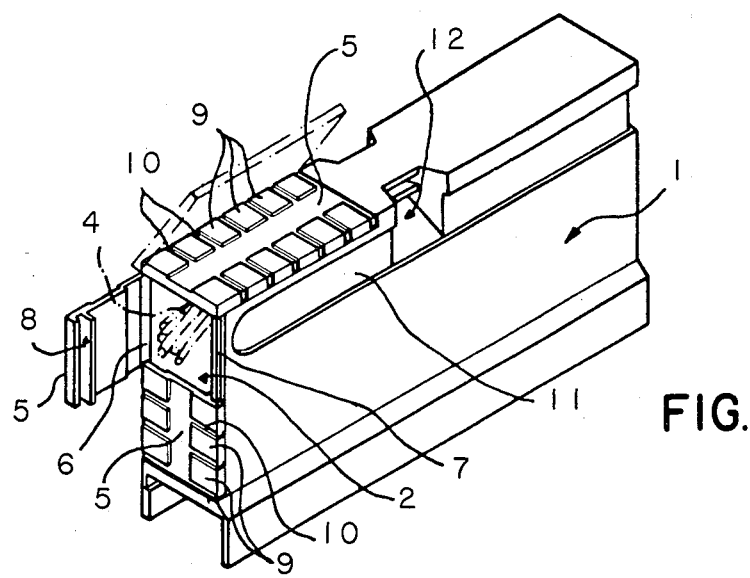
FIG. 1 is a perspective view showing a closure hood in accordance with the present invention, with one opening which is closed by a respective closing piece, and another opening which is partially open and through which a conductor bundle extends.

A closure element or closure hood in accordance with the present invention is identified as a whole with reference numeral 1. It is used for closing a multi-pole electrical connector and can be plugged with its lower respectively formed arresting region, for example onto a contact strip of the multi pole electrical connector.

The closing hood 1 has an opening 2 provided in its narrow end side. It is also provided with an opening 3 which is formed in its upper side and borders the opening 2, in a corner of the closure hood. The opening 3 is closed in FIG.1 and is clearly shown in FIG. 2. Therefore, a conductor bundle 4 which is shown in dot-dash line in FIG. 1 can be selectively led out by a user through the end side or through the upper side of the closure hood 1 in dependence upon an available space.

In the shown embodiment the openings 2 and 3 have practically identical lengths and therefore are closeable or closed by identical associated closing pieces 5. However, it should be mentioned that this construction is not limited to identically long openings and thereby to identically dimensioned closing pieces. The openings 2 and 3 can have different lengths within a wide range. In this case, the associated closing pieces 5 will have respective different lengths.

The closing pieces 5 are foldably connected in one edge region of the openings 2 and 3 of the closure hood 1. In accordance with an advantageous feature of the present invention, the closing pieces are articulately connected to the edge of the openings 2 and 3 over their whole length by means of a film hinge 6.

Figure 2:
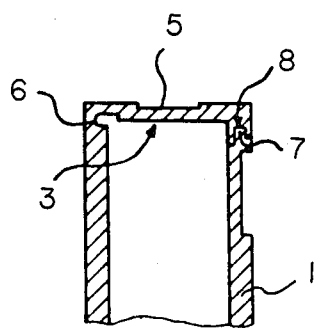
FIG. 2 is a view showing a partial section of the inventive closure hood of FIG. 1, in which the closing piece is in its closed position.

Fixing means is further provided for fixing the closing pieces on the other edge of the openings 2 and 3 after their folding about an axis formed by the film hinge 6. The fixing means includes an arresting rib 7 formed at the opposite edge region of each opening 2 and 3 on the closure hood 1 and an arresting groove 8 formed on a respective free end of the closing piece 5. The arresting rib 7 engages into the arresting groove 8 as shown in FIG. 2

The closing pieces 5 are formed from assembled partial segments 9. The partial segments 9 are arranged so that a transverse separation of the individual segments 5 is possible in a simple manner, such as separation of the closing piece 5 in direction of the film hinge 6. In the shown embodiment, transverse notches extend over the film hinge in the closing pieces 5 for easy transverse separation by means of a cutting device.

The thus designed closure hoods can be supplied by a manufacturer to a user with the open closing pieces 5. The user selects the required cross section for passage of the conductor bundle 4 and the desired direction of leading-out of the conductor bundle 4 from the closure hood 1. The user then selects respectively which opening 2 or 3 is required and what size of a passage through the selected opening is required for leading-out of the conductor bundle 4. The opening which is not used is completely closed by folding of the associated closing piece 5 and its arresting at the opposite edge by engaging the arresting rib 7 in the arresting groove 8.

Partial segments 9 in the quantity required for providing the passage for the conductor bundle 4 are separated from the other closing piece of the other opening. The partial segments 9 of this closing piece 5, which are not needed for this purpose, are used for closing the region of this opening which is not needed for passage of the conductor bundle 4. The separated partial segments which are foldably connected by the respective portion of the film hinge 6 with the edge of the associated opening of the closure hood, remain in the open position. Thereby the conductor bundle 4 can be led out of the closure hood, while the partial segments 9 of the closing piece 5, which remain in the open position, serve for pull unloading, for example by connecting the conductor bundle 4 with these open partial segments.

The closure hood is provided with depressions 11 which extend over its whole length on its both sides. The depressions 11 in the region of the openings 2 and 3 facilitate the formation and shaping of the film hinge 6 on one edge side, and the formation and shaping of the arresting rib 7 on the other edge side. Constrictions 12 extend at both sides from the depressions 11 and form together with the latter an ergonomically favorable gripping portion for the closure hood 1.

It is to be understood that instead of two separate closing pieces provided for closing the respectiuve openings, a single closing piece can be used. Such single closing pieces have two closing portions each associated with a respective one of the openings and each composed of a plurality of separable partial segments. The portions are also separable from one another in the corner region between them.

The present invention is not limited to the details shown, since various modifications and structural changes are possible without departing in any way from the spirit of the invention.

What is desired to be protected by Letters Patent is set forth in particular in the appended claims.

We claim:

1. A closure element for a multi-pole electrical connector, comprising in combination
    a hood-shaped body having narrow end sides and an upper side, a first opening provided in one of said end sides and a second opening provided in said upper side and bordering with said first opening for selectively leading out a bundle of conductors connected with the electrical connector, each of said openings having one edge and another opposite edge;
    means for closing said openings and including two closing pieces each foldably connected with one edge and releasably securable to the opposite edge of a respective one of said openings, each of said closing pieces being transversely separable into a plurality of partial segments which are formed so that upon separation they release a required passage for the conductor bundle in the respective opening, and at the same time remain foldably connected with the one edge of the respective opening so as to form pull release means in the region of the passage for the conductor bundle.

2. A closure element as defined in claim 1, wherein said hood-shaped body and said closing pieces are formed of one piece with one another.

3. A closure element as defined in claim 1; and further comprising means for foldably connecting each of said closing pieces with said one edge of a respective one of said openings, said connecting means including a film hinge.

4. A closure element as defined in claim 1; and further comprising means for releasably securing each of said closing pieces on the opposite edge of a respective one of said openings and including an arresting groove and a complementary arresting rib engageable in said arresting groove.

5. A closure element as defined in claim 4, wherein each of said closing pieces has a free edge, said arresting rib being provided on said opposite edge of each of said openings, while said arresting groove is provided on said free edge of each of said connecting pieces.

6. A closure element as defined in claim 1, wherein each of said closing pieces is foldable about a folding axis and separable into said partial segments along said folding axis.

7. A closure element as defined in claim 6, wherein each of said closing pieces is provided with a plurality of transverse notches extending along said folding axis for separating each of said closing pieces into said partial segments.

8. A closure element for a multi-pole electrical connector, comprising
    a hood-shaped body having narrow end sides and an upper side, a first opening provided in one of said end sides and a second opening provided in said upper side and bordering with said first opening for selectively leading out a bundle of conductors connected with the electrical connector, each of said openings having one edge and another opposite edge;
    means for closing said openings and including a closing piece foldably connected with one edge and releasably securable to the opposite edge of a respective one of said openings, said closing piece including two closing portions each provided for closing a respective one of said openings and each transversely separable into a plurality of partial segments which are formed so that upon separation they release a required passage for the conductor bundle in the respective opening, and at the same time remain foldably connected with the one edge of the respective opening, so as to form pull release means in the region of the passage for the conductor bundle.

* * * * *